US012701180B1

(12) United States Patent
Kulhanek

(10) Patent No.: US 12,701,180 B1
(45) Date of Patent: Aug. 4, 2026

(54) HOLDER FOR A CELLULAR PHONE

(71) Applicant: Kevin Kulhanek, Darien, IL (US)

(72) Inventor: Kevin Kulhanek, Darien, IL (US)

(73) Assignee: Kevin Kulhanek, Lemont, IL (US)

( * ) Notice: Subject to any disclaimer, the term of this patent is extended or adjusted under 35 U.S.C. 154(b) by 327 days.

(21) Appl. No.: 18/607,657

(22) Filed: Mar. 18, 2024

Related U.S. Application Data

(60) Provisional application No. 63/498,374, filed on Apr. 26, 2023.

(51) Int. Cl.
H04M 1/04 (2006.01)

(52) U.S. Cl.
CPC ..................................... H04M 1/04 (2013.01)

(58) Field of Classification Search
CPC ................. H04M 1/04; B60R 11/0241; B60R 2011/0059; B60R 2011/0071; H04B 1/3888; B65D 51/24; A47G 19/2227; B60N 3/101; B60N 3/103; Y10S 224/926; F16M 11/041; F16M 13/00; F16M 13/022
See application file for complete search history.

(56) References Cited

U.S. PATENT DOCUMENTS

| | | | | |
|---|---|---|---|---|
| 7,954,773 | B2 * | 6/2011 | Carnevali | B60N 3/103 |
| | | | | 248/314 |
| 10,933,815 | B1 * | 3/2021 | Khubani | B60R 11/0241 |
| 11,338,971 | B1 * | 5/2022 | Capper | B65D 51/24 |
| 12,365,522 | B2 * | 7/2025 | Raymus | B65D 25/20 |
| 12,452,355 | B2 * | 10/2025 | Alves | A45F 5/1516 |
| 12,559,288 | B2 * | 2/2026 | Lin | B65D 51/24 |
| 2018/0228280 | A1 * | 8/2018 | Li | B65D 51/24 |
| 2019/0018452 | A1 * | 1/2019 | Caron | F16M 13/00 |
| 2019/0063667 | A1 * | 2/2019 | Law | H04M 1/04 |
| 2022/0303375 | A1 * | 9/2022 | Chen | H04M 1/04 |
| 2024/0151346 | A1 * | 5/2024 | Lu | A45F 3/18 |
| 2024/0225329 | A1 * | 7/2024 | Lobato | A47G 23/0241 |

* cited by examiner

*Primary Examiner* — Cindy Trandai
(74) *Attorney, Agent, or Firm* — Sisson & Banyas, Attorneys at Law, LLC; Jeffrey J. Banyas

(57) ABSTRACT

A holder which allows a cellular phone to be held on a feature of a lid of a water bottle includes a cradle and an attachment mechanism. The cradle includes a base member, a first wall integrally connected to and extending upwardly from a top surface of the base member at the first edge of the base member, and a second wall integrally connected to and extending upwardly from the top surface of the base member at the second edge of the base member. The attachment mechanism connects to and extends downwardly from a bottom surface of the base member and is configured to attach the holder to the surface of the lid of the water bottle. The cradle is configured to hold the cellular phone between the first wall and the second wall with at least a portion of one edge of the cellular phone resting against the top surface.

19 Claims, 12 Drawing Sheets

HOLDER FOR A CELLULAR PHONE

CROSS REFERENCES AND PRIORITIES

This application claims priority from U.S. Provisional Application No. 63/498,374 filed on 26 Apr. 2023, the teachings of which are incorporated by reference herein in their entirety.

BACKGROUND

Many cellular phone stands exist in the market. In general, cellular phone stands allow a user to securely mount or affix their cellular phone to an object-usually a surface of a table or a desk, or a fixed point within a vehicle such as a dashboard or a heating/air conditioning vent.

While existing cellular phone stands are sufficient for mounting or affixing a cellular phone to their intended surfaces—such as a table, desk, or vehicle dashboard—mounting a cellular phone to surfaces in other environments has proven difficult. One such environment is a home or commercial gym where a user may wish to have access to their cellular phone—particularly smart phones—for making phone calls, sending text messages, browsing the internet, watching videos, or even recording video of themselves during their exercise routine. In these environments the user is often operating exercise equipment such as a treadmill, stationary bicycle, elliptical machine, or the like. Such exercise equipment typically does not include a surface conducive to receiving traditional cellular phone stands which are adapted for desks, tables, vehicle dashboards and the like.

Exercise equipment often includes a holder for a water bottle. Several attempts have been made to mount or affix a cellular phone to a water bottle. One such attempt is described in U.S. Pat. No. 10,571,068 B2 which describes a mobile device stand includes a supporting stand, an adjustable frame and an adaptive mounting arrangement. The adaptive mounting arrangement includes a mounting connector provided on the adjustable frame. The mounting connector includes a tubular mounting member having a mounting cavity. In the mobile mode, the tubular mounting member is arranged to securely and detachably mount on a cap portion of a bottle so as to detachably mount the adjustable frame on the bottle.

In practice, the existing solutions to mount or affix a cellular phone to a water bottle suffer from several flaws. Most notably the existing solutions are typically designed to adapt to the threaded cap section of a disposable water bottle. These solutions prove ineffective for gym users who typically utilize a refillable water bottle (typically a water bottle which is not made of a polyester material). In addition, the existing solutions often include a variety of small, finely machined components which can easily be damaged during an exercise routine. Finally, the existing solutions often make the cellular phone cumbersome to operate-particularly for those seeking to quickly access their phone and/or record video during their exercise routine.

The need exists, therefore, for an improved holder for allowing a cellular phone to be attached to a water bottle.

SUMMARY

Disclosed herein is a holder for a cellular phone. The holder comprises a cradle and an attachment mechanism. The cradle comprises a base member, a first wall, and a second wall. The base member has a top surface, a bottom surface opposite the top surface, a first edge, and a second edge opposite the first edge. The first wall is integrally connected to and extends upwardly from the top surface of the base member at the first edge of the base member. The second wall is integrally connected to and extends upwardly from the top surface of the base member at the second edge of the base member. The attachment mechanism is connected to and extends downwardly from the bottom surface. The attachment member is configured to attach the holder to a feature of a water bottle. The cradle is configured to hold the cellular phone between the first wall and the second wall with at least a portion of one edge of the cellular phone resting against the top surface.

The first wall has a first wall inner surface. In some embodiments, a first angle formed between the top surface and the first wall inner surface may be in a range of between $80°$ and $110°$.

The second wall has a second wall inner surface. In certain embodiments, a second angle formed between the top surface and the second wall inner surface is in a range of between $45°$ and $90°$.

In some embodiments, the first wall may comprise a recess located along a top edge of the first wall opposite the top surface.

In certain embodiments the attachment mechanism may comprise a first attachment member and a second attachment member. In such embodiments, the first attachment member may be integrally connected to and extend downwardly from the bottom surface of the base member at the first edge of the base member. The first attachment member may have a first tab integrally connected to and extending inwardly from a first attachment member inner surface at a first attachment member end opposite the bottom surface. The second attachment member may be integrally connected to and extend downwardly from the bottom surface of the base member at the second edge of the base member. The second attachment member may have a second tab integrally connected to and extending inwardly from a second attachment member inner surface at a second attachment member second end opposite the bottom surface.

In some embodiments, the attachment mechanism may comprise a third attachment member and a fourth attachment member. The third attachment member may be integrally connected to and extend downwardly from the bottom surface of the base member at the first edge of the base member. The third attachment member may have a third tab and a first protrusion. The third tab may be integrally connected to and extend downwardly from a third attachment member inner surface at a third attachment member end opposite the bottom surface. The first protrusion may be integrally connected to and extend upwardly from a third tab top surface. The fourth attachment member may be integrally connected to and extend downwardly from the bottom surface of the base member at the second edge of the base member. The fourth attachment member may have a fourth tab and a second protrusion. The fourth tab may be integrally connected to and extend inwardly from a fourth attachment member inner surface at a fourth attachment member end opposite the bottom surface. The second protrusion may be integrally connected to and extend upwardly from a fourth tab top surface.

In certain embodiments, the feature of the water bottle may be a feature of the lid of the water bottle. The feature of the lid of the water bottle may be a handle, a flip top, or a surface of the lid. In other embodiments, the feature of the water bottle may be a handle extending from a sidewall of the water bottle.

DETAILED DESCRIPTION

Disclosed herein is a holder for a cellular phone. The holder is described below with reference to the Figures. As described herein and in the claims, the following numbers refer to the following structures as noted in the Figures.

10 refers to a holder.
100 refers to a cradle.
110 refers to a base member.
111 refers to a top surface (of the base member).
112 refers to a bottom surface (of the base member).
113 refers to a first edge (of the base member).
114 refers to a second edge (of the base member).
120 refers to a first wall.
121 refers to a first wall inner surface.
122 refers to a recess.
123 refers to a top edge (of the first wall).
130 refers to a second wall.
200 refers to an attachment mechanism.
210 refers to a first attachment member.
211 refers to a first tab.
212 refers to a first attachment member inner surface.
213 refers to a first attachment member end.
220 refers to a second attachment member.
221 refers to a second tab.
222 refers to a second attachment member inner surface.
223 refers to a second attachment member end.
230 refers to a third attachment member.
231 refers to a third tab.
232 refers to a third attachment member inner surface.
233 refers to a third attachment member end.
234 refers to a first protrusion.
235 refers to a third tab top surface.
240 refers to a fourth attachment member.

241 refers to a fourth tab.
242 refers to a fourth attachment member inner surface.
243 refers to a fourth attachment member end.
244 refers to a second protrusion.
245 refers to a fourth tab top surface.
300 refers to a water bottle.
310 refers to a lid (of the water bottle).
400 refers to a cellular phone.
$\alpha_1$ refers to a first angle.
$\alpha_2$ refers to a first angle.

Figure 1:
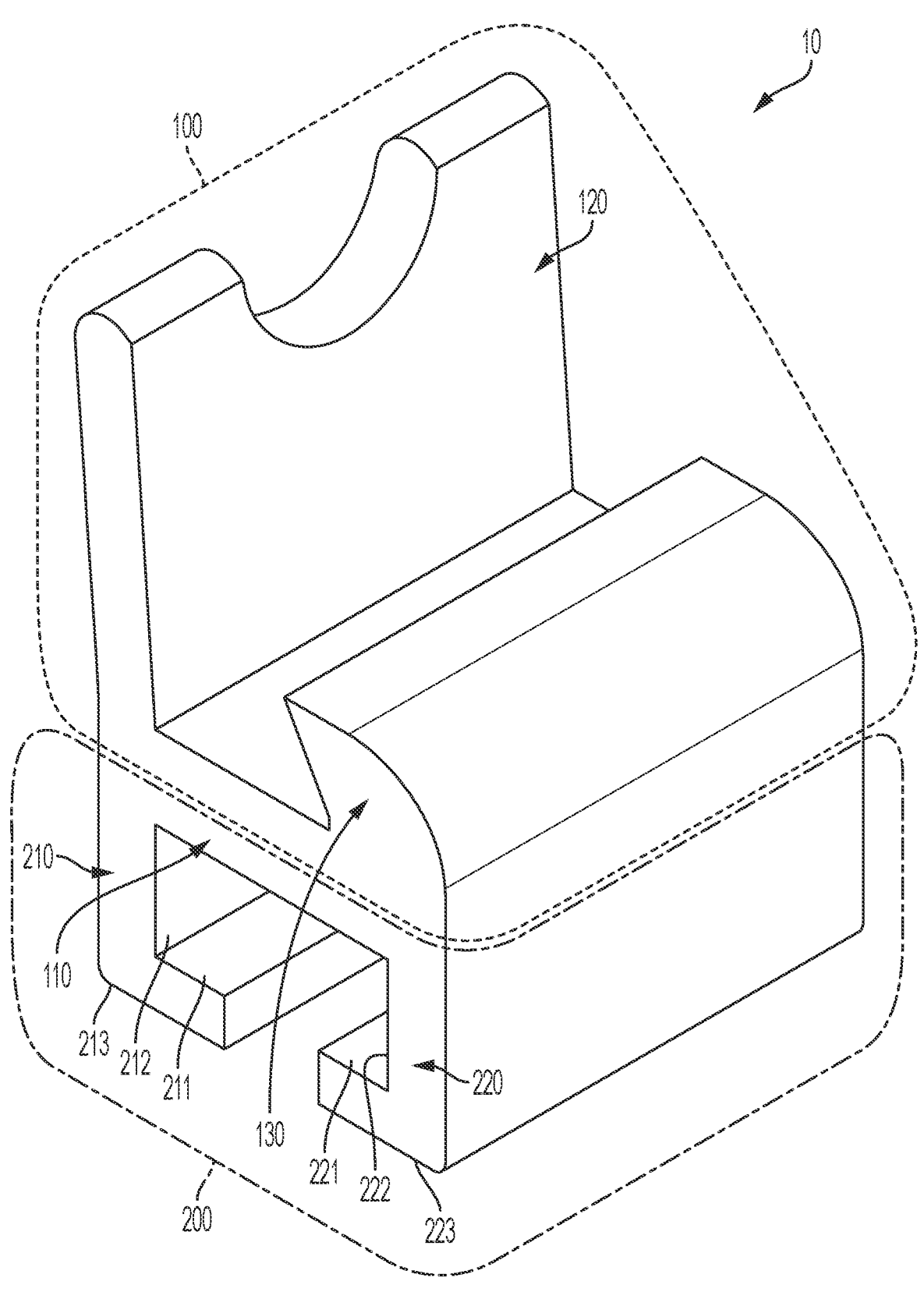
FIG. 1 is a perspective view of one embodiment of a holder for a cellular phone.
Figure 4:
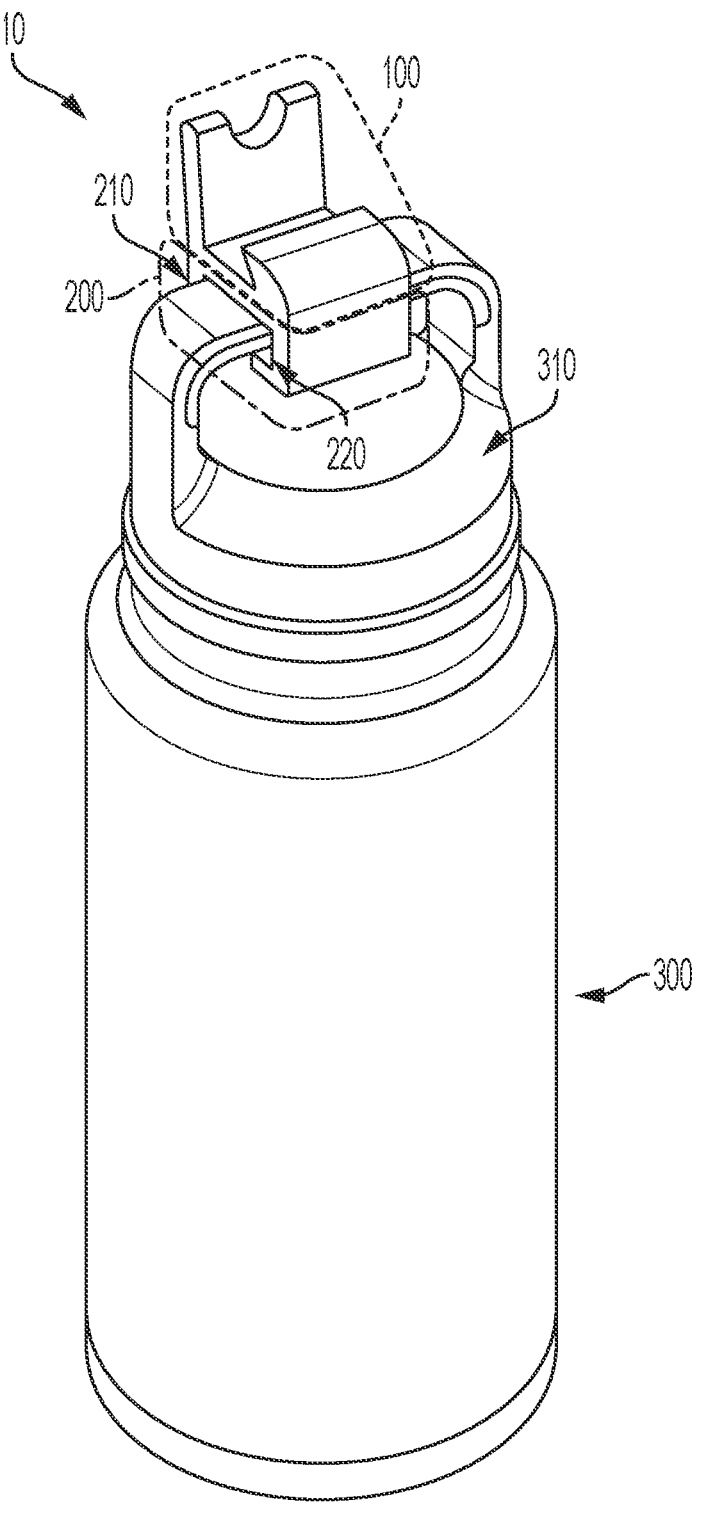
FIG. 4 is a perspective view of the embodiment of a holder for a cellular phone of FIG. 1 attached to a feature of a lid of a water bottle.
Figure 5:
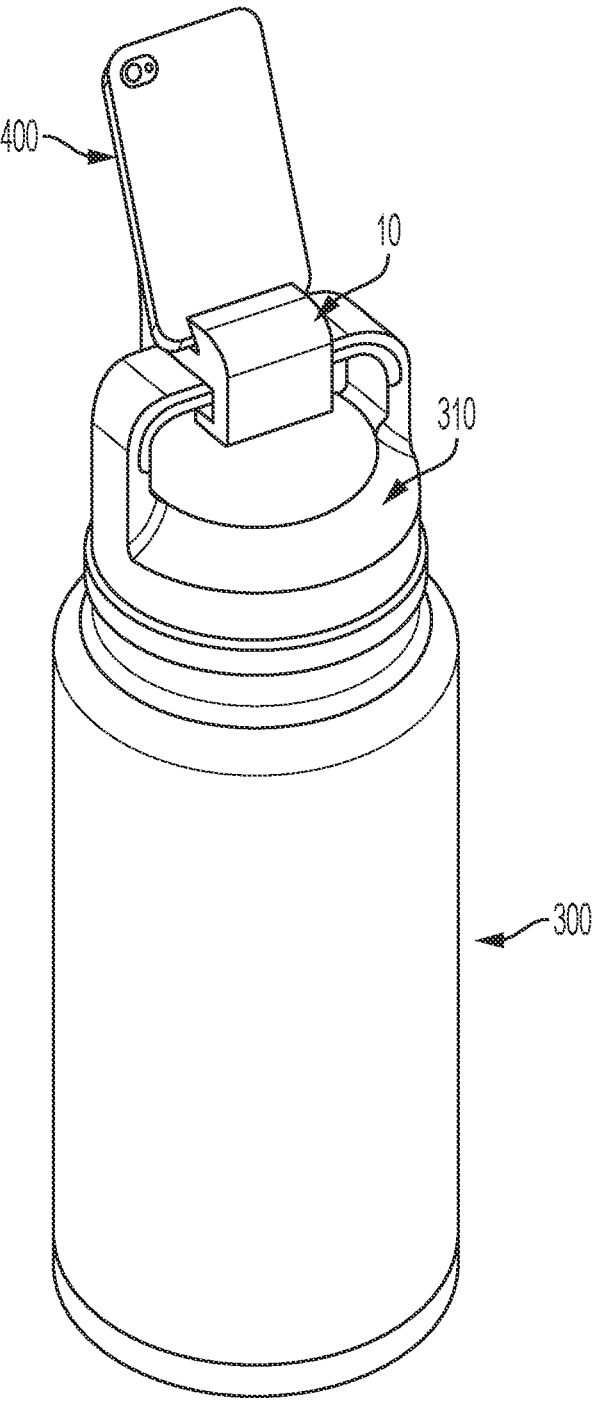
FIG. 5 is a perspective view of the embodiment of a holder for a cellular phone of FIG. 1 attached to a feature of a lid of a water bottle and holding a cellular phone.

FIG. 1 shows a first embodiment of a holder (10) which allows a cellular phone (400 as shown in FIG. 5) to be held on a feature of a water bottle (300 as shown in FIG. 4). The feature of the water bottle may be a feature extending from a sidewall of the water bottle—such as a handle—or may be a feature of a lid (310 as shown in FIG. 4) of the water bottle. When the feature of the water bottle is a feature of the lid, the feature may be a surface of the lid itself, or another apparatus, such as a handle or a flip top, attached to the surface of the lid. As shown in FIG. 1, the holder comprises a cradle (100) and an attachment mechanism (200).

Figure 2:
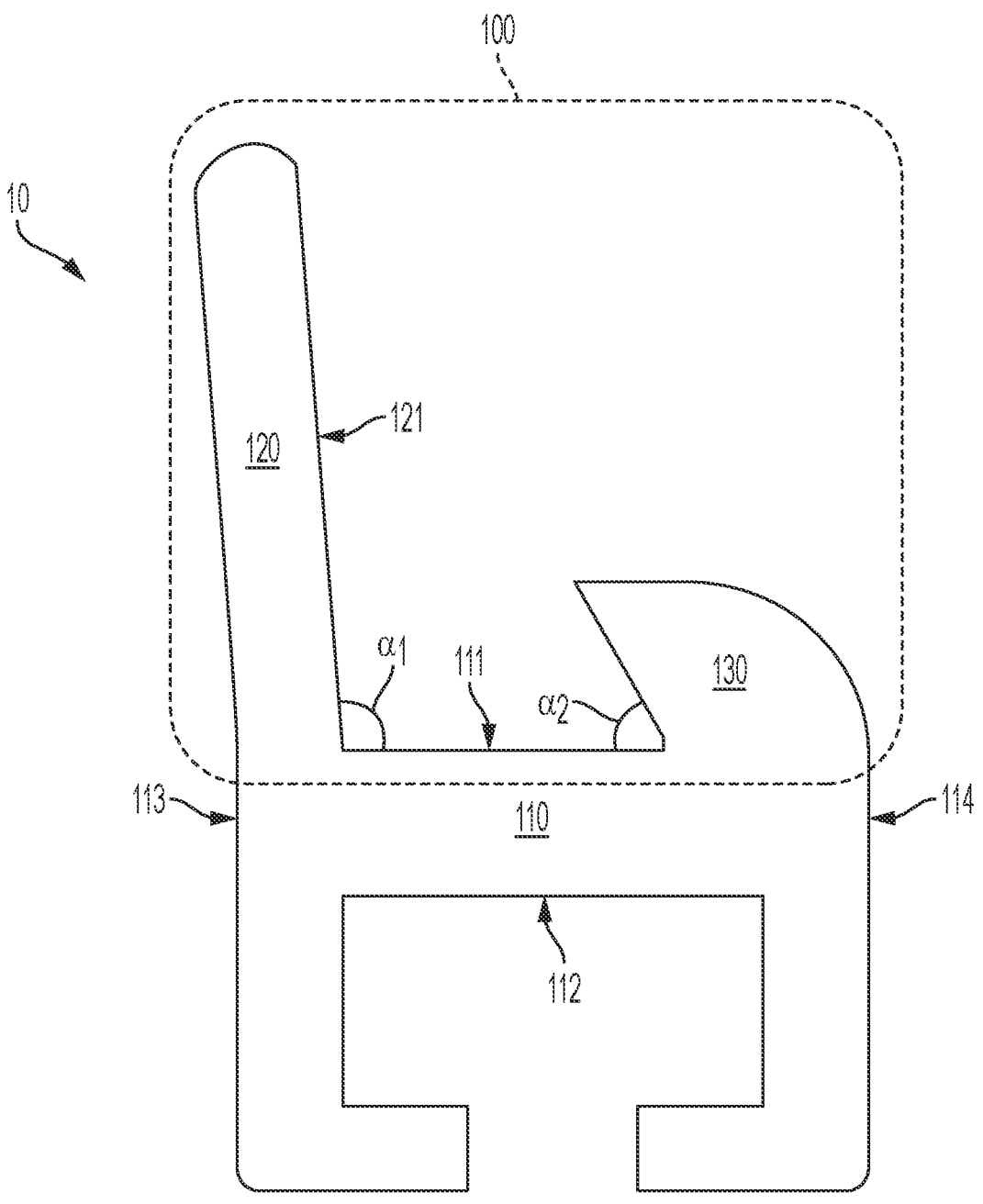
FIG. 2 is a side view of the embodiment of a holder for a cellular phone of FIG. 1.

The cradle (100) in the embodiment shown in FIG. 1 comprises a base member (110), a first wall (120), and a second wall (130). The base member has at least a top surface (111 as shown in FIG. 2), a bottom surface (112 as shown in FIG. 2) opposite the top surface, a first edge (113 as shown in FIG. 2), and a second edge (114 as shown in FIG. 2) opposite the first edge. Extending upwardly from the top surface of the base member at the first edge of the base member is the first wall. Similarly, extending upwardly from the top surface of the base member at the second edge of the base member is the second wall. The cradle is configured to hold a cellular phone (400 as shown in FIG. 5)—preferably of a smart phone style—between the first wall and the second wall with at least a portion of one edge of the cellular phone resting against the top surface.

The attachment mechanism (200) is connected to and extends downwardly from the bottom surface (112) of the base member (110) of the cradle (100). The attachment mechanism is then configured to attach the holder (10) to a feature of a lid (310 as shown in FIG. 4) of a water bottle (300 as shown in FIG. 4).

A number of different types of attachment mechanisms may exist, one of which is shown in the embodiments illustrated in FIG. 1 through FIG. 5 with the water bottle (300) shown in FIG. 4 and FIG. 5 being a Yeti® Rambler® type water bottle available from Yeti Coolers, LLC-Austin, Texas, U.S.A. As shown in FIG. 1, the attachment mechanism (200) in this embodiment comprises a first attachment member (210) and a second attachment member (220).

The first attachment member (210) may be integrally connected to and extend downwardly from the bottom surface (112 as shown in FIG. 2) of the base member (110) at the first edge (113 as shown in FIG. 2) of the base member. As shown in FIG. 1, the first attachment member may include a first tab (211) integrally connected to and extending inwardly from a first attachment member inner surface (212) at a first attachment member end (213) which is opposite the bottom surface.

Similarly, the second attachment member (220) may be integrally connected to and extend downwardly from the bottom surface (112 as shown in FIG. 2) of the base member (110) at the second edge (114 as shown in FIG. 2) of the base member. As shown in FIG. 1, the second attachment member may include a second tab (221) integrally connected to and extending inwardly from a second attachment member inner surface (222) at a second attachment member end (223) which is opposite the bottom surface.

FIG. 2 illustrates a side view of the embodiment of a holder (10) shown in FIG. 1. As shown in FIG. 2, a first angle (α1) is formed between the top surface (111) of the base member (110) and the first wall inner surface (121). The first angle may be in a range of between 80° and 130°. Preferably, the first angle in the embodiment shown in FIG. 1 through FIG. 5 will be greater than 90° but less than 130°.

FIG. 2 also shows a second angle (@2) formed between the top surface (111) of the base member (110) and the second wall inner surface. The second angle may be in a range of between 45° and 90°. Preferably, the second angle in the embodiment shown in FIG. 1 through FIG. 5 will be greater than 45° but less than 80°. The first angle (α1) and the second angle combined allow for the cellular phone (400 as shown in FIG. 5) to be held within the cradle at an angle allowing the user to easily view the cellular phones screen, take photographs, and/or record videos.

Figure 3:
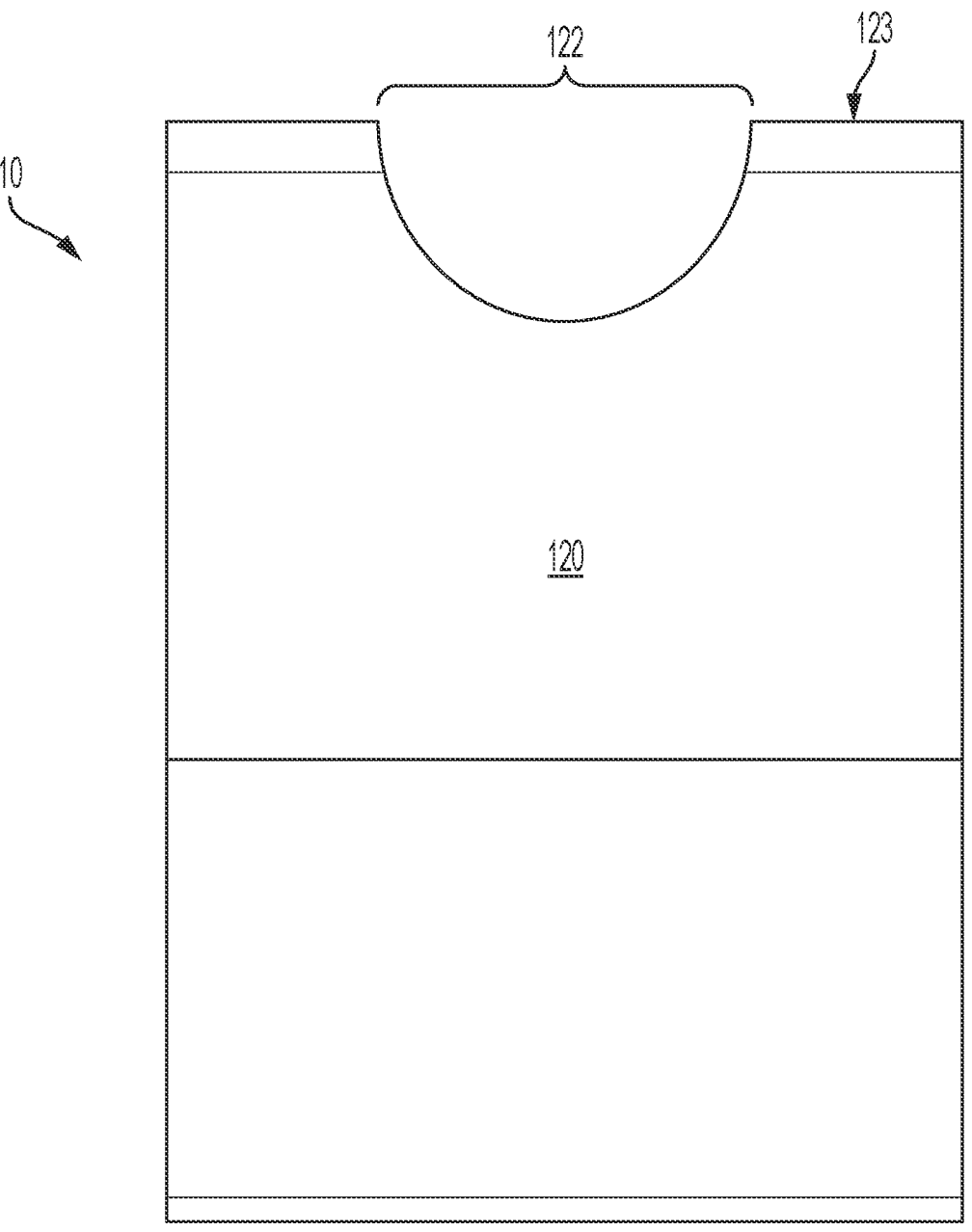
FIG. 3 is a rear view of the embodiment of a holder for a cellular phone of FIG. 1.

FIG. 3 illustrates a rear view of the embodiment of a holder (10) shown in FIG. 1 looking towards the first wall (120). As shown in FIG. 3, in some embodiments, the first wall may comprise a recess (122). When present, the recess may be located along a top edge (123) of the first wall opposite the top surface (111 as shown in FIG. 2) of the base member (110 as shown in FIG. 2). As shown in FIG. 3, the recess has an arched shape. Preferably, the recess—when present—may be approximately sized and shaped to correspond with the size, shape, and location of a "record" button located on the screen face of the cellular phone when the cellular phone is held within the cradle (100) so that the user can operate the record button.

FIG. 4 shows the embodiment of a holder (10) from FIG. 1 attached to the lid (310) of a water bottle (300), which in this case is a Yeti® Rambler® type water bottle available from Yeti Coolers, LLC—Austin, Texas, U.S.A. The Yeti® Rambler® type water bottle includes a feature of a lid (310) which is an upwardly protruding handle extending from the lid to which the attachment mechanism (200) connects with a portion of the first attachment member inner surface (212 as shown in FIG. 1) abutting against at least a portion of the first side surface of the handle and the first tab (211 as shown in FIG. 1) abutting against at least a portion of the bottom surface of the handle. Similarly, a portion of the second attachment member inner surface (222 as shown in FIG. 2) abuts against at least a portion of the second side surface of the handle while the second tab (221 as shown in FIG. 1) abuts against at least a portion of the bottom surface of the lid's handle.

Figure 6:
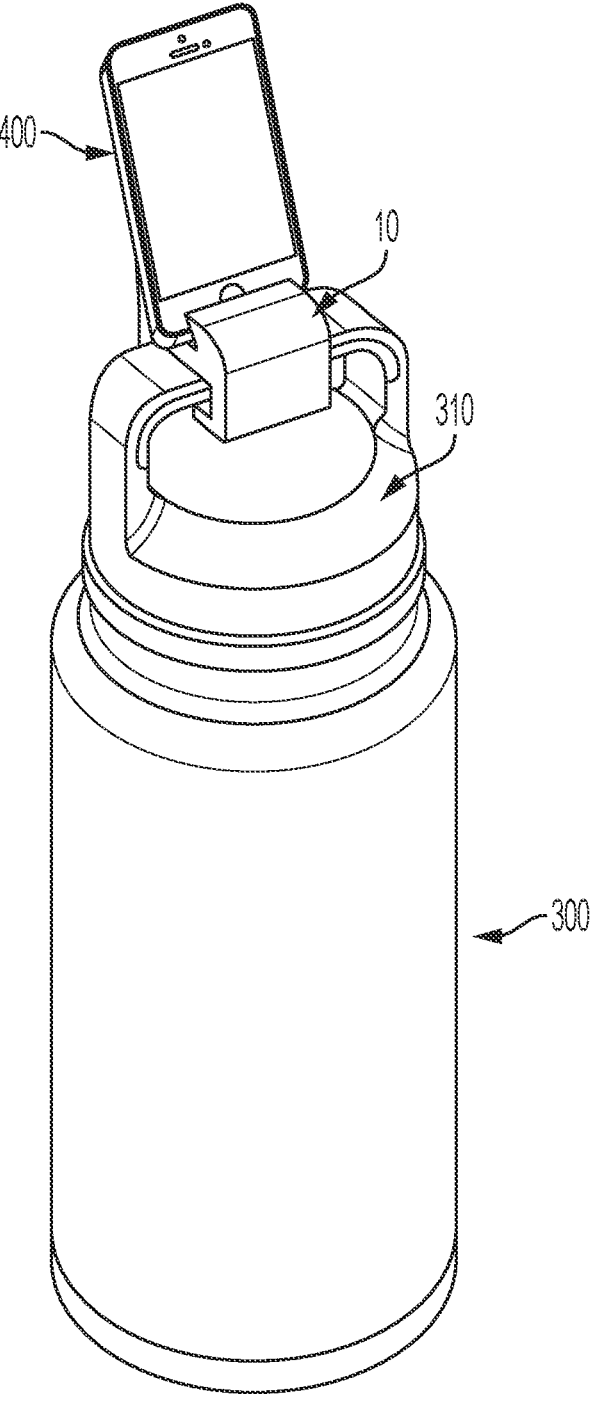
FIG. 6 is a perspective view of the embodiment of a holder for a cellular phone of FIG. 1 attached to a feature of a lid of a water bottle and holding a cellular phone.

FIG. 5 and FIG. 6 illustrate the embodiment of a holder (10) from FIG. 1 attached to the lid (310) of a water bottle (300), which in this case is a Yeti® Rambler® type water bottle available from Yeti Coolers, LLC—Austin, Texas, U.S.A. with a cellular phone (400) disposed within the cradle (100 as shown in FIG. 4). In this case the cellular phone is an Apple® iPhone® type smart phone available from Apple, Inc.—Cupertino, California, U.S.A. In FIG. 5, the cellular phone is configured with the screen facing the first wall (120 as shown in FIG. 1) while in FIG. 6, the cellular phone is configured with the screen facing the second wall (130 as shown in FIG. 1). While FIG. 5 and FIG. 6 show the cellular phone disposed within the cradle in a vertically/portrait oriented position, certain users may dispose the cellular phone within the cradle in a horizontally/landscape oriented position (not shown).

Figure 7:
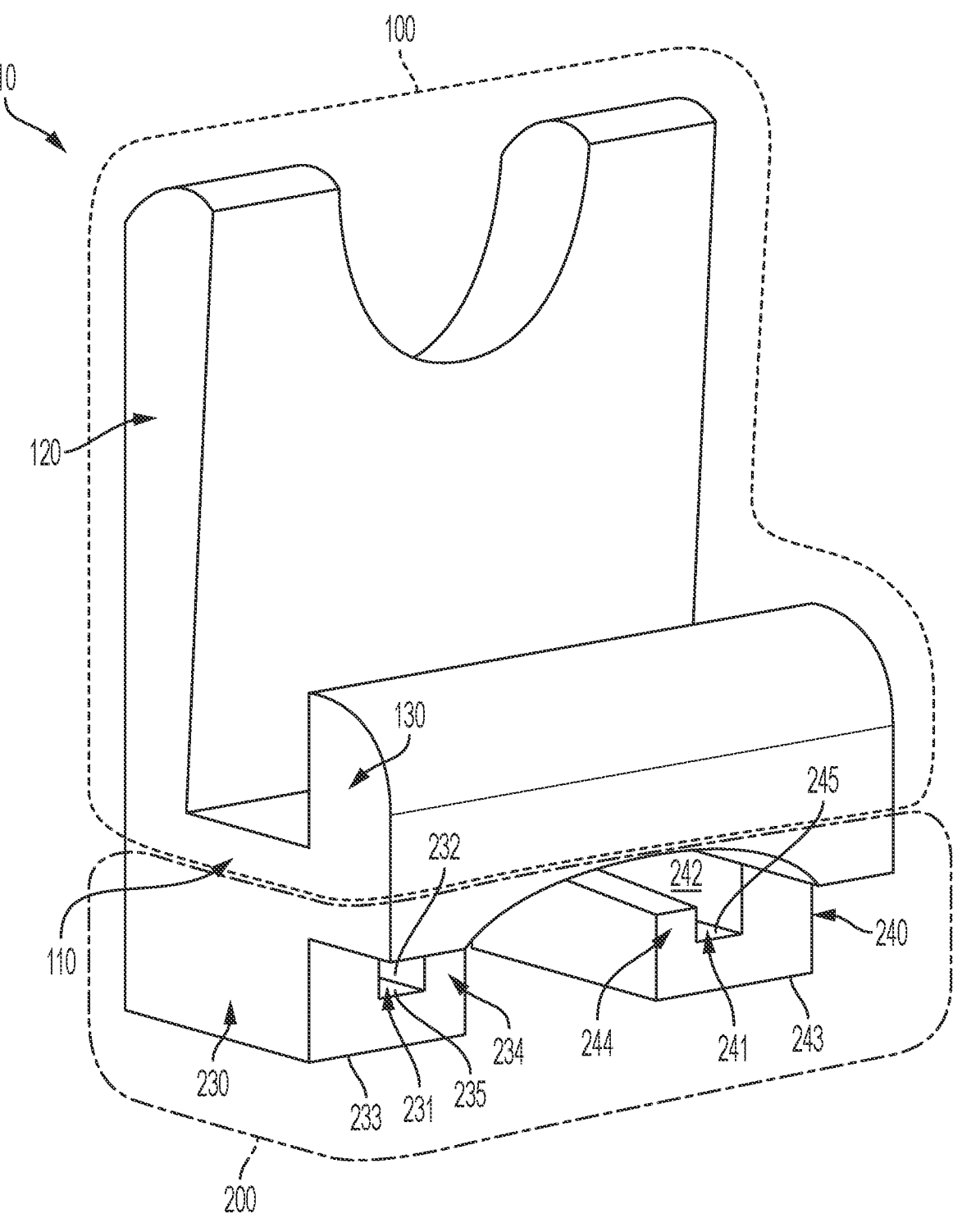
FIG. 7 is a perspective view of one embodiment of a holder for a cellular phone.
Figure 10:
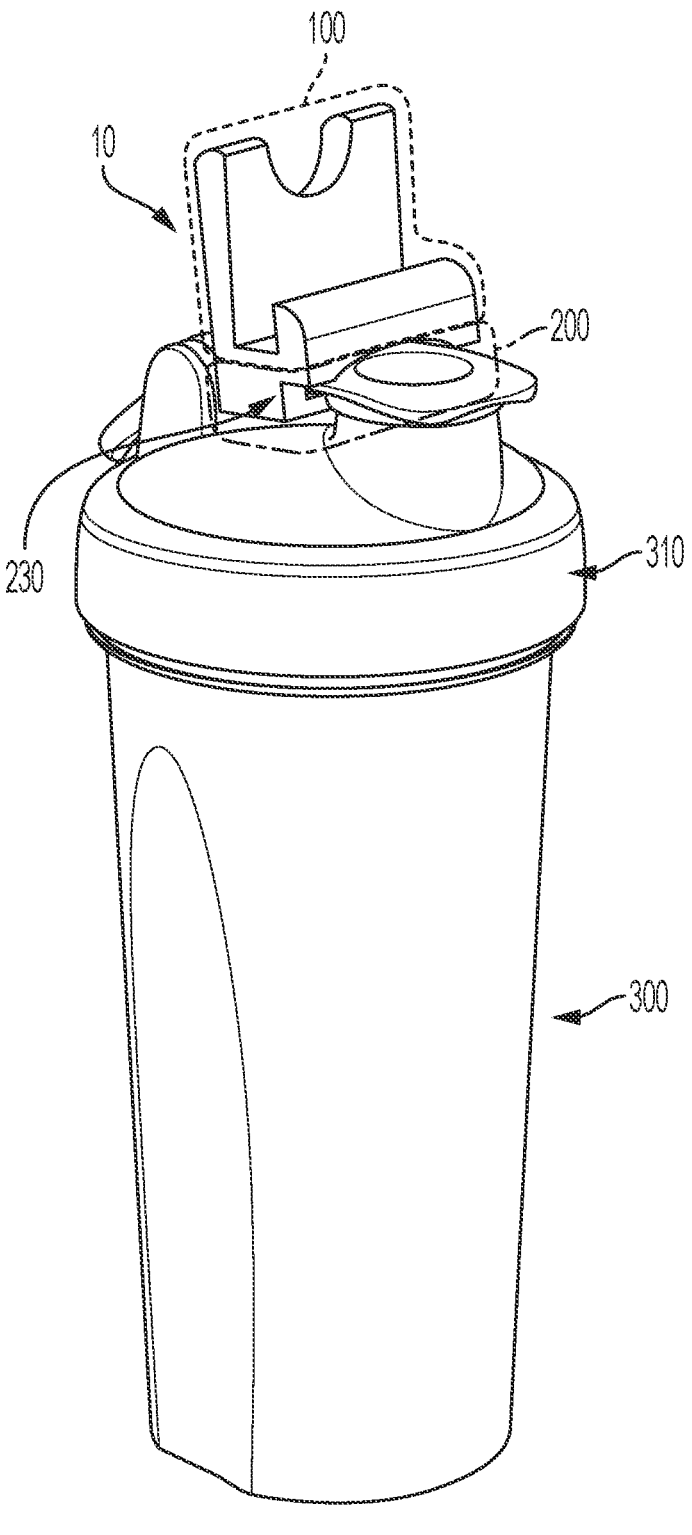
FIG. 10 is a perspective view of the embodiment of a holder for a cellular phone of FIG. 7 attached to a feature of a lid of a water bottle.

FIG. 7 shows an alternative embodiment of a holder (10) which allows a cellular phone (400 as shown in FIG. 10) to be held on a feature of a water bottle (300 as shown in FIG. 10). Again, the feature of the water bottle may be a feature extending from a sidewall of the water bottle—such as a handle—or may be a feature of a lid (310 as shown in FIG. 10) of the water bottle. When the feature of the water bottle is a feature of the lid, the feature may be a surface of the lid itself, or another apparatus, such as a handle or a flip top, attached to the surface of the lid. The embodiment shown in FIG. 7 is adapted for use in conjunction with a Blender-Bottle® type water bottle available from Trove Brands, LLC—Lehi, Utah, U.S.A. Like the embodiment shown in FIG. 1, the embodiment of a holder shown in FIG. 7 comprises a cradle (100) and an attachment mechanism (200).

Figure 8:
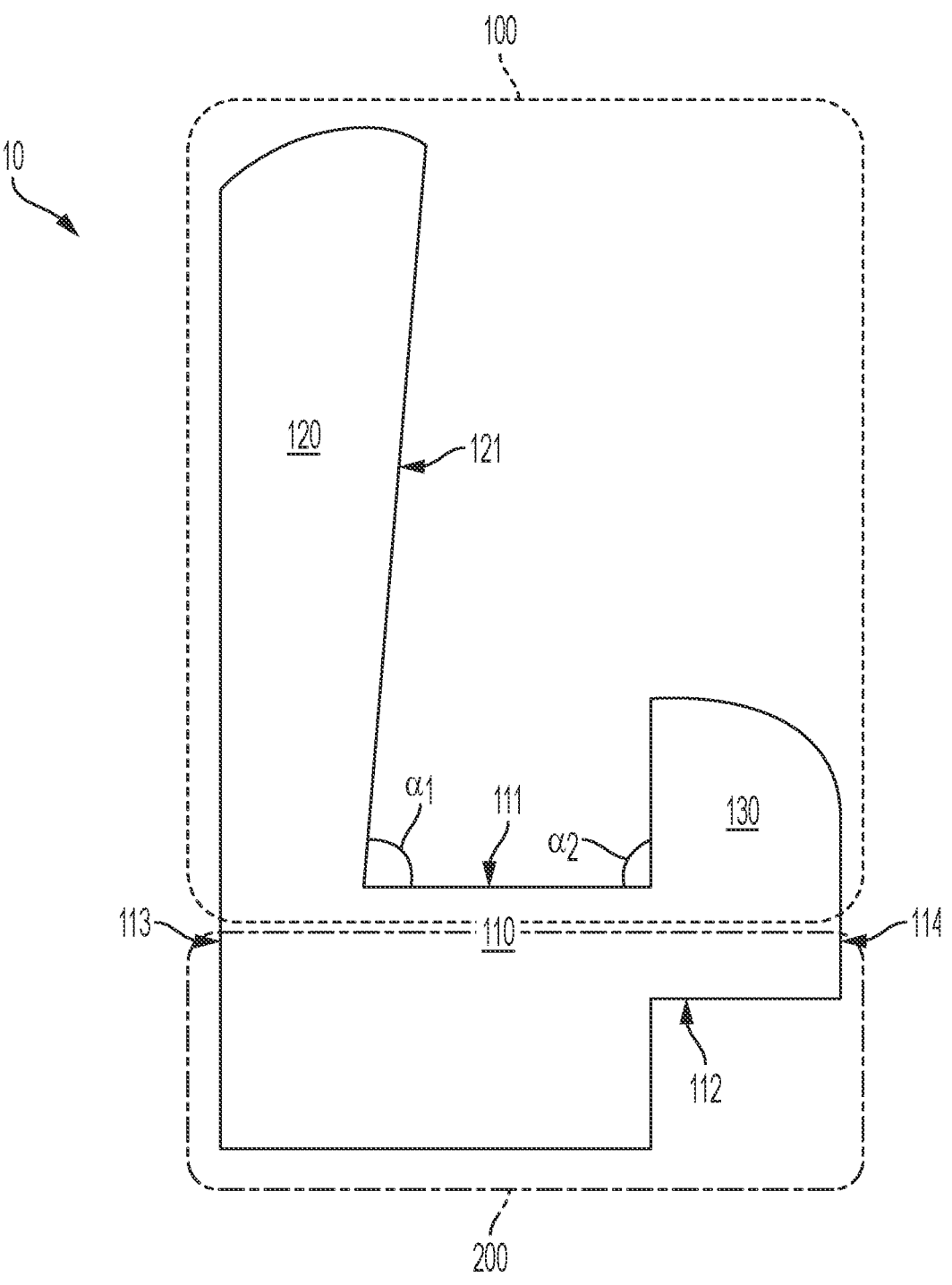
FIG. 8 is a side view of the embodiment of a holder for a cellular phone of FIG. 7.
Figure 11:
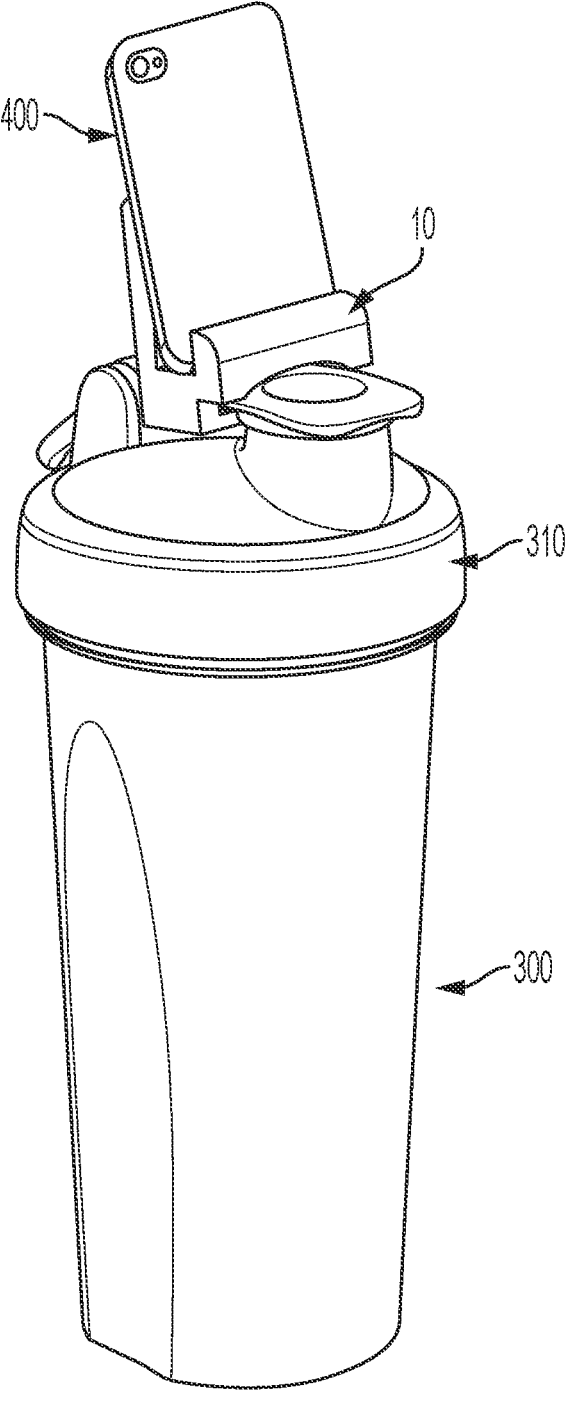
FIG. 11 is a perspective view of the embodiment of a holder for a cellular phone of FIG. 7 attached to a feature of a lid of a water bottle and holding a cellular phone.

The cradle (100) in the embodiment shown in FIG. 7 comprises a base member (110), a first wall (120), and a second wall (130). The base member has at least a top surface (111 as shown in FIG. 8), a bottom surface (112 as shown in FIG. 8) opposite the top surface, a first edge (113 as shown in FIG. 8), and a second edge (114 as shown in FIG. 8) opposite the first edge. Extending upwardly from the top surface of the base member at the first edge of the base member is the first wall. Similarly, extending upwardly from the top surface of the base member at the second edge of the base member is the second wall. The cradle is configured to hold a cellular phone (400 as shown in FIG. 11)—preferably of a smart phone style—between the first wall and the second wall with at least a portion of one edge of the cellular phone resting against the top surface.

The attachment mechanism (200) is connected to and extends downwardly from the bottom surface (112 as shown in FIG. 8) of the base member (110) of the cradle (100). The attachment mechanism is then configured to attach the holder (10) to a feature of a lid (310 as shown in FIG. 10) of a water bottle (300 as shown in FIG. 10).

The attachment mechanism (200) in the embodiments illustrated in FIG. 7 through FIG. 12 is adapted for use with a BlenderBottle® type water bottle available from Trove Brands, LLC—Lehi, Utah, U.S.A. As shown in FIG. 7, the attachment mechanism (200) in this embodiment comprises a third attachment member (230) and a fourth attachment member (240).

The third attachment member (230) may be integrally connected to and extend downwardly from the bottom surface (112 as shown in FIG. 8) of the base member (110) at the first edge (113 as shown in FIG. 8) of the base member. As shown in FIG. 7, the third attachment member may include a third tab (231) integrally connected to and extending inwardly from a third attachment member inner surface (232) at a third attachment member end (233) which is opposite the bottom surface. The third attachment member may also include a first protrusion (234) integrally connected to and extending upwardly from a third tab top surface (235).

Similarly, the fourth attachment member (240) may be integrally connected to and extend downwardly from the bottom surface (112 as shown in FIG. 8) of the base member (110) at the second edge (114 as shown in FIG. 8) of the base member. As shown in FIG. 7, the fourth attachment member may include a fourth tab (241) integrally connected to and extending inwardly from a fourth attachment member inner surface (242) at a fourth attachment member end (243) which is opposite the bottom surface. The fourth attachment member may also include a second protrusion (244) integrally connected to and extending upwardly from a fourth tab top surface (245).

FIG. 8 illustrates a side view of the embodiment of a holder (10) shown in FIG. 7. As shown in FIG. 8, a first angle (α1) is formed between the top surface (111) of the base member (110) and the first wall inner surface (121). The first angle may be in a range of between 80° and 110°. Preferably, the first angle in the embodiment shown in FIG. 1 through FIG. 6 will be greater than 90° but less than 110°.

FIG. 8 also shows a second angle (α2) formed between the top surface (111) of the base member (110) and the second wall inner surface. The second angle may be in a range of between 45° and 90°. Preferably, the second angle in the embodiment shown in FIG. 7 through FIG. 12 will be approximately or exactly 90°. The first angle (α1) and the second angle combined allow for the cellular phone (400 as shown in FIG. 11) to be held within the cradle at an angle allowing the user to easily view the cellular phones screen, take photographs, and/or record videos.

Figure 9:
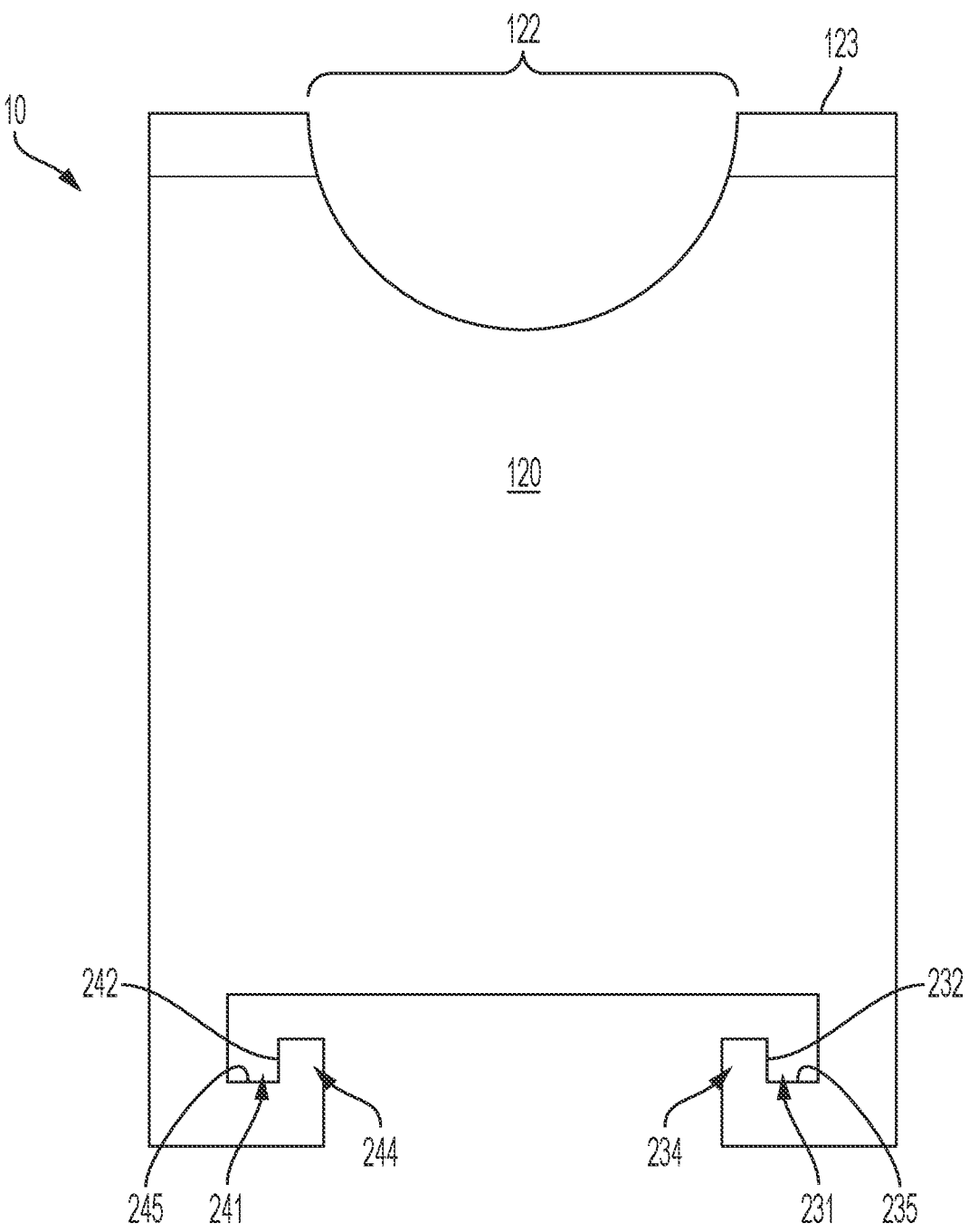
FIG. 9 is a rear view of the embodiment of a holder for a cellular phone of FIG. 7.

FIG. 9 illustrates a rear view of the embodiment of a holder (10) shown in FIG. 7 looking towards the first wall (120). As shown in FIG. 9, in some embodiments, the first wall may comprise a recess (122). When present, the recess may be located along a top edge (123) of the first wall opposite the top surface (111 as shown in FIG. 8) of the base member (110 as shown in FIG. 8). As shown in FIG. 9, the recess has an arched shape. Preferably, the recess—when present—may be approximately sized and shaped to correspond with the size, shape, and location of a "record" button located on the screen face of the cellular phone when the cellular phone is held within the cradle (100) so that the user can operate the record button.

FIG. 10 shows the embodiment of a holder (10) from FIG. 7 attached to the lid (310) of a water bottle (300), which in this case is a BlenderBottle® type water bottle available from Trove Brands, LLC—Lehi, Utah, U.S.A. The BlenderBottle® type water bottle includes a feature which is a flip top closure to which the attachment mechanism (200 as shown in FIG. 7) connects with a portion of the third attachment member inner surface (232 as shown in FIG. 7) abutting against at least a portion of the first side surface of the flip top closure, the third tab (231 as shown in FIG. 7) abutting against at least a portion of the bottom surface of the flip top closure, and at least a portion of the first protrusion (234 as shown in FIG. 7) abutting against at least a portion of the bottom surface of the flip top closure. Similarly, a portion of the fourth attachment member inner surface (242 as shown in FIG. 7) abuts against at least a portion of the second side surface of the flip top closure while the fourth tab (241 as shown in FIG. 7) abuts against at least a portion of the bottom surface of the handle and at least a portion of the second protrusion (244 as shown in FIG. 7) abuts against at least a portion of the bottom surface of the lid's flip top closure.

Figure 12:
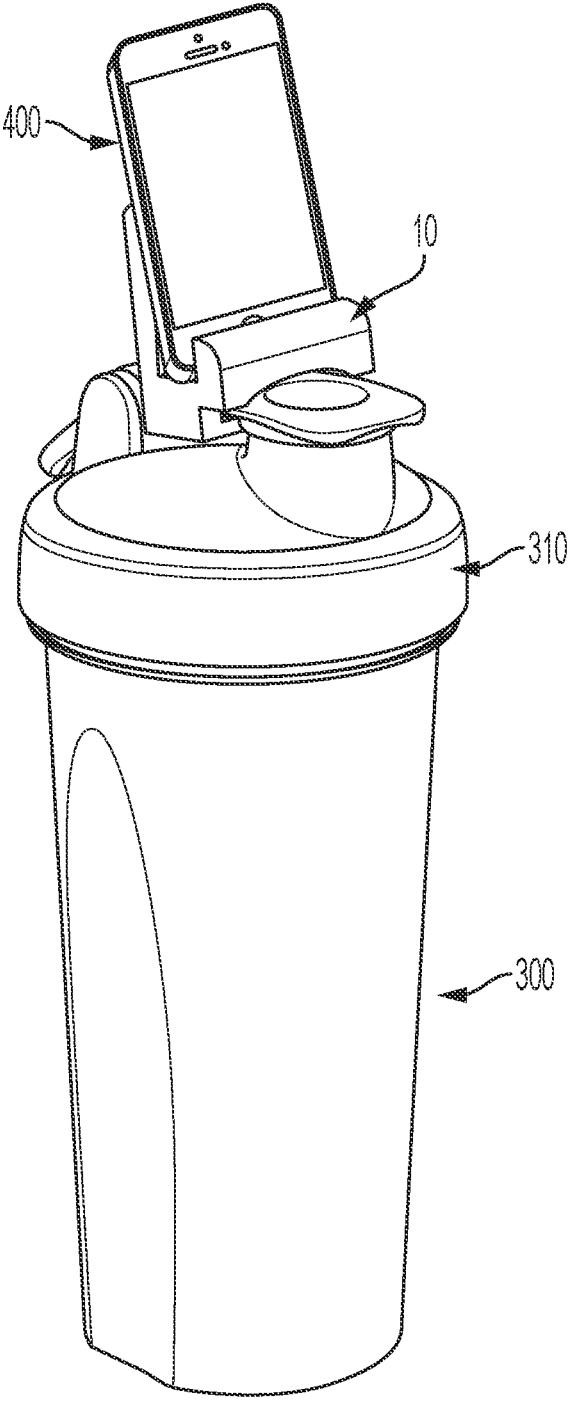
FIG. 12 is a perspective view of the embodiment of a holder for a cellular phone of FIG. 7 attached to a feature of a lid of a water bottle and holding a cellular phone.

FIG. 11 and FIG. 12 illustrate the embodiment of a holder (10) from FIG. 7 attached to the lid (310) of a water bottle (300), which in this case is a BlenderBottle® type water bottle available from Trove Brands, LLC—Lehi, Utah, U.S.A. with a cellular phone (400) disposed within the cradle (100 as shown in FIG. 10). In this case the cellular phone is an Apple® iPhone® type smart phone available from Apple, Inc.—Cupertino, California, U.S.A. In FIG. 11, the cellular phone is configured with the screen facing the first wall (120 as shown in FIG. 7) while in FIG. 12, the cellular phone is configured with the screen facing the second wall (130 as shown in FIG. 7). While FIG. 11 and FIG. 12 show the cellular phone disposed within the cradle in a vertically/portrait oriented position, certain users may dispose the cellular phone within the cradle in a horizontally/landscape oriented position (not shown).

The holders described herein may be manufactured of any number of materials. Preferred materials include polymer materials such as the polyesters and the polyamides. Other materials include wood and metals such as aluminum, steel, stainless steel, titanium, and the like. When the holder is manufactured of a polymer material, the holder may be manufactured using a variety of different manufacturing techniques including injection molding, additive manufacturing (i.e.—3D printing), and the like.

The holders described herein can be attached to refillable water bottles—such as the Yeti® Rambler® type water bottle or the BlenderBottle® type water bottle—often utilized in home or commercial gyms. In addition, the holders described herein are of a unitary design without small, finely machined components which are prone to damage or failure if/when the water bottle is jostled or dropped during an exercise routine. Finally, the holders described herein allow for easy operation of the users cellular phone during an exercise routine—particularly allowing easy access to the cellular phone's record button in embodiments where the first wall comprises a recess.

While the invention has been described as having exemplary designs, the present invention may be further modified within the spirit and scope of this disclosure. This application is therefore intended to cover any variations, uses, or adaptations of the invention using its general principles.

What is claimed is:

1. A holder (10) for a cellular phone comprising:

a cradle (100) comprising:

a base member (110) having a top surface (111), a bottom surface (112) opposite the top surface, a first edge (113), and a second edge (114) opposite the first edge;

a first wall (120) integrally connected to and extending upwardly from the top surface of the base member at the first edge of the base member; and a second wall (130) integrally connected to and extending upwardly from the top surface of the base member at the second edge of the base member; and an attachment mechanism (200) connected to and extending downwardly from the bottom surface, said attachment mechanism configured to attach the holder to a feature of a water bottle (300); and wherein the cradle is configured to hold the cellular phone (400) between the first wall and the second wall with at least a portion of one edge of the cellular phone resting against the top surface; and the attachment mechanism comprises:

a first attachment member (210) integrally connected to and extending downwardly from the bottom surface of the base member at the first edge of the base member, said first attachment member having a first tab (211) integrally connected to and extending inwardly from a first attachment member inner surface (212) at a first attachment member end (213) opposite the bottom surface; and a second attachment member (220) integrally connected to and extending downwardly from the bottom surface of the base member at the second edge of the base member, said second attachment member having a second tab (221) integrally connected to and extending inwardly from a second attachment member inner surface (222) at a second attachment member end (223) opposite the bottom surface.

2. The holder of claim 1, wherein the feature of the water bottle is a feature of the lid (310) of the water bottle.

3. The holder of claim 2, wherein the feature of the lid of the water bottle is a handle, a flip top, or a surface of the lid.

4. The holder of claim 1, wherein the feature of the water bottle is a handle extending from a sidewall of the water bottle.

5. The holder of claim 1, wherein the first wall has a first wall inner surface (121) and a first angle ($\alpha$1) formed between the top surface and the first wall inner surface is in a range of between 80° and 110°.

6. The holder of claim 5, wherein the second wall has a second wall inner surface (131) and a second angle ($\alpha$2) formed between the top surface and the second wall inner surface is in a range of between 45° and 90°.

7. The holder of claim 6, wherein the first wall comprises a recess (122) located along a top edge (123) of the first wall opposite the top surface.

8. The holder of claim 5, wherein the first wall comprises a recess (122) located along a top edge (123) of the first wall opposite the top surface.

9. The holder of claim 1, wherein the second wall has a second wall inner surface (131) and a second angle ($\alpha$2) formed between the top surface and the second wall inner surface is in a range of between 45° and 90°.

10. The holder of claim 9, wherein the first wall comprises a recess (122) located along a top edge (123) of the first wall opposite the top surface.

11. The holder of claim 1, wherein the first wall comprises a recess (122) located along a top edge (123) of the first wall opposite the top surface.

12. A holder (10) for a cellular phone comprising:

a cradle (100) comprising:

a base member (110) having a top surface (111), a bottom surface (112) opposite the top surface, a first edge (113), and a second edge (114) opposite the first edge;

a first wall (120) integrally connected to and extending upwardly from the top surface of the base member at the first edge of the base member; and a second wall (130) integrally connected to and extending upwardly from the top surface of the base member at the second edge of the base member; and an attachment mechanism (200) connected to and extending downwardly from the bottom surface, said attachment mechanism configured to attach the holder to a feature of a water bottle (300); and wherein the cradle is configured to hold the cellular phone (400) between the first wall and the second wall with at least a portion of one edge of the cellular phone resting against the top surface; and the attachment mechanism comprises:

a third attachment member (230) integrally connected to and extending downwardly from the bottom surface of the base member at the first edge of the base member, said third attachment member having:

a third tab (231) integrally connected to and extending inwardly from a third attachment member inner surface (232) at a third attachment member end (233) opposite the bottom surface; and a first protrusion (234) integrally connected to and extending upwardly from a third tab top surface (235); and a fourth attachment member (240) integrally connected to and extending downwardly from the bottom surface of the base member at the second edge of the base member, said fourth attachment member having:

a fourth tab (241) integrally connected to and extending inwardly from a fourth attachment member inner surface (242) at a fourth attachment member end (243) opposite the bottom surface; and a second protrusion (244) integrally connected to and extending upwardly from a fourth tab top surface (245).

13. The holder of claim 12, wherein the first wall has a first wall inner surface (121) and a first angle ($\alpha$1) formed between the top surface and the first wall inner surface is in a range of between 80° and 110°.

14. The holder of claim 13, wherein the second wall has a second wall inner surface (131) and a second angle ($\alpha$2) formed between the top surface and the second wall inner surface is in a range of between 45° and 90°.

15. The holder of claim 14, wherein the first wall comprises a recess (122) located along a top edge (123) of the first wall opposite the top surface.

16. The holder of claim 13, wherein the first wall comprises a recess (122) located along a top edge (123) of the first wall opposite the top surface.

17. The holder of claim 12, wherein the second wall has a second wall inner surface (131) and a second angle ($\alpha$2) formed between the top surface and the second wall inner surface is in a range of between 45° and 90°.

18. The holder of claim 17, wherein the first wall comprises a recess (122) located along a top edge (123) of the first wall opposite the top surface.

19. The holder of claim 12, wherein the first wall comprises a recess (122) located along a top edge (123) of the first wall opposite the top surface.

\* \* \* \* \*